US009058681B2

(12) United States Patent
Troy et al.

(10) Patent No.: US 9,058,681 B2
(45) Date of Patent: Jun. 16, 2015

(54) SENSOR-ENHANCED LOCALIZATION IN VIRTUAL AND PHYSICAL ENVIRONMENTS

(75) Inventors: James J. Troy, Issaquah, WA (US); Kevin Puterbaugh, Auburn, WA (US); Christopher Esposito, Issaquah, WA (US); John C. Gass, Sammamish, WA (US)

(73) Assignee: The Boeing Company, Chicago, IL (US)

( * ) Notice: Subject to any disclaimer, the term of this patent is extended or adjusted under 35 U.S.C. 154(b) by 308 days.

(21) Appl. No.: 13/486,725

(22) Filed: Jun. 1, 2012

(65) Prior Publication Data

US 2013/0321391 A1     Dec. 5, 2013

(51) Int. Cl.
*G06T 15/00* (2011.01)
*G06F 3/01* (2006.01)
*G06F 3/0346* (2013.01)

(52) U.S. Cl.
CPC .............. *G06T 15/00* (2013.01); *G06F 3/011* (2013.01); *G06F 3/0346* (2013.01)

(58) Field of Classification Search
CPC ........ G06T 15/00; G06F 3/0346; G06F 3/011
USPC .............. 345/419, 473, 474, 475; 463/30, 36; 382/103
See application file for complete search history.

(56) References Cited

U.S. PATENT DOCUMENTS 6,852,032 B2 * 2/2005 Ishino .............................. 463/30
8,138,938 B2    3/2012 Troy
8,229,163 B2 * 7/2012 Coleman et al. .............. 382/103
8,395,760 B2 * 3/2013 Wang ............................. 356/4.01
8,708,821 B2 * 4/2014 Barney et al. ................... 463/36
2006/0023203 A1  2/2006 Gatsios et al.
2006/0180648 A1  8/2006 Miller et al.
2007/0038409 A1  2/2007 Gilson et al.

(Continued)

FOREIGN PATENT DOCUMENTS

DE    10 2005 004155 A1    3/2006
WO         WO 00 39576 A1    7/2000

OTHER PUBLICATIONS

Booth, K., "Google Sky Map Takes to the Stars" Pittsburgh Magazine, Retrieved from http://www.pittsburghmagazine.com/Pittsburgh-Magazine/December-2010/Google-Sky-Map-Takes-to-the-Stars/, Dec. 8, 2010, 3 pages.

(Continued)

*Primary Examiner* — Phu K Nguyen
(74) *Attorney, Agent, or Firm* — Toler Law Group, PC

(57) ABSTRACT

In one embodiment, a computer-based system comprises a measurement device, a display, a processor, and logic instructions stored in a tangible computer-readable medium coupled to the processor which, when executed by the processor, configure the processor to determine a position and orientation in a real three dimensional space of the measurement device relative to at least one real object in the three dimensional space and render on the display, a perspective view of a virtual image of a virtual object corresponding to the real object in a virtual three-dimensional space, wherein the perspective view of the virtual object corresponds to the perspective view of the real object from the position of the measurement device.

21 Claims, 4 Drawing Sheets

(56) References Cited

U.S. PATENT DOCUMENTS

| | | |
|---|---|---|
| 2009/0112349 A1 | 4/2009 | Cobb et al. |
| 2010/0102980 A1 | 4/2010 | Troy et al. |
| 2011/0088030 A1 | 4/2011 | Agesen et al. |
| 2011/0149266 A1 | 6/2011 | Motzer et al. |

OTHER PUBLICATIONS

Coschurba et al., Research Issues in Developing a Platform for Spatial-Aware Applications; ACM SIGOPS European Workshop, XP-002353381, Sep. 17, 2000, (6 pgs).

* cited by examiner

SENSOR-ENHANCED LOCALIZATION IN VIRTUAL AND PHYSICAL ENVIRONMENTS

RELATED APPLICATIONS

This application is related to U.S. patent application Ser. No. 12/640,211 to Motzer, et al., entitled POSITION AND ORIENTATION DETERMINATION USING MOVEMENT DATA, and to U.S. Pat. No. 8,138,938 to Troy, et al., entitled HAND-HELD POSITIONING INTERFACE FOR SPATIAL QUERY, the disclosures of which are incorporated herein by reference in their respective entirety.

BACKGROUND

Assembly and maintenance of large objects, such as repositionable structures, may be assisted by the use of positioning systems to guide placement of components. For example, aircraft may be assembled in facilities that include position determination systems and equipment to measure the position of certain components of the aircraft, such as wings and empennage, to ensure proper placement of the components. In airplane manufacturing, mechanics and quality assurance (QA) inspectors often need to find a specific location on an airplane. They may use paper printouts with text descriptions of the locations listed in terms of Cartesian X, Y, Z coordinates (sometimes referred to as station, buttline, and waterline in the aircraft industry). Sometimes drawings may also be used for guidance. Once the desired location is reached, the mechanic or QA inspector may need to perform tasks such as documenting coordinates of damage of items that need to be repaired. In some instances a tape measure may be used to determine distances from landmarks or features near the area of interest, which may be written down or typed into a laptop. These processes can be time consuming and are open to multiple sources of error, such as misinterpretation of the text or drawings, confusion regarding how the measurements are made, and manual transcription errors. Therefore, it is desirable to have a process for physical motion tracking that can be integrated with 3D models of the corresponding virtual environment.

Existing position determination systems suffer from various deficiencies. By way of example, optical motion capture is limited by size of the system and occlusions, magnetic tracking is affected by magnetic interference, simultaneous localization and mapping (SLAM)-based methods require continuous visibility of high contrast features in the environment which are not always available, especially on the outside of the airplane. Standard inertial measurement unit (IMU) solutions for personal tracking suffer from accelerometer drift problems that cause direct computation of position to become unreliable over time.

Accordingly, systems and methods for 3D localization and navigation in a variable environment may find utility.

SUMMARY

In one embodiment, a computer-based method comprises determining a position and orientation in a real three-dimensional space of a measurement device relative to at least one real object in the three-dimensional space and rendering on a display device coupled to the measurement device, a perspective view of a virtual image of a virtual object corresponding to the real object in a virtual three-dimensional space, wherein the perspective view of the virtual object corresponds to the perspective view of the real object from the position and orientation derived from the data received from the measurement device.

In another embodiment, a computer-based system comprises a measurement device, a display, a processor, and logic instructions stored in a tangible computer-readable medium coupled to the processor which, when executed by the processor, configure the processor to determine a position and orientation in a real three-dimensional space of the measurement device relative to at least one real object in the three-dimensional space and render on the display, a perspective view of a virtual image of a virtual object corresponding to the real object in a virtual three-dimensional space, wherein the perspective view of the virtual object corresponds to the perspective view of the real object from the position of the measurement device.

In another embodiment, a computer program product comprising logic instructions stored in a tangible computer-readable medium coupled to a processor which, when executed by the processor, configure the processor to determine a position and orientation in a real three-dimensional space of a measurement device relative to at least one real object in the three-dimensional space and render on a display device coupled to the measurement device, a perspective view of a virtual image of a virtual object corresponding to the real object in a virtual three-dimensional space, wherein the perspective view of the virtual object corresponds to the perspective view of the real object from the position of the measurement device.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

Embodiments of methods, systems, and computer program products in accordance with the teachings of the present disclosure are described in detail below with reference to the following drawings.

DETAILED DESCRIPTION

Systems and methods for IMU-based localization that enables navigation are described herein. Specific details of certain embodiments are set forth in the following description and figures to provide a thorough understanding of such embodiments. One skilled in the art will understand, however, that alternate embodiments may be practiced without several of the details described in the following description.

The concepts described here involve interaction techniques to control virtual world navigation by user motions in the corresponding physical environment, while still allowing the user to see and manipulate the physical objects and use CAD visualization features for analysis. Various embodiments described here are set in the context of performing manufacturing and/or maintenance operations in complex vehicles such as aircraft, ships, trains, motor vehicles, buildings, and other structures. As used herein, the term "vehicle" should be construed to include any of these objects. In accordance with embodiments described herein, a virtual three-dimensional (3D) model of the vehicle may be stored in a memory of a computer system. A portable computing device which includes, or is coupled to, an IMU and which includes a display and sufficient processing power to store at least portions of the 3D model may be positioned at a designated, known location proximate or inside the vehicle such that one or more real objects are positioned proximate the portable computing device. A virtual image of one or more virtual objects corresponding to the real objects may be presented on the display and aligned such that a perspective view of the virtual image on the display corresponds to the perspective view of the one or more real objects using relative position and orientation data from the IMU-based localization process, thereby synchronizing the virtual environment with the real environment. This step initializes the IMU-based position and orientation tracking process at this location, and all subsequent motion will be defined relative to this location. As the IMU is moved through the real environment the virtual environment depicted on the display of the computing device changes correspondingly. Additional corrections may be applied by the user when necessary to re-initialize the IMU-based tracking process to a new location. In some embodiments the IMU generates signals representative of rotation and/or translation of the computing device. In other embodiments rotation and translation inputs may be provided to the computing device via a user interface.

Figure 1:
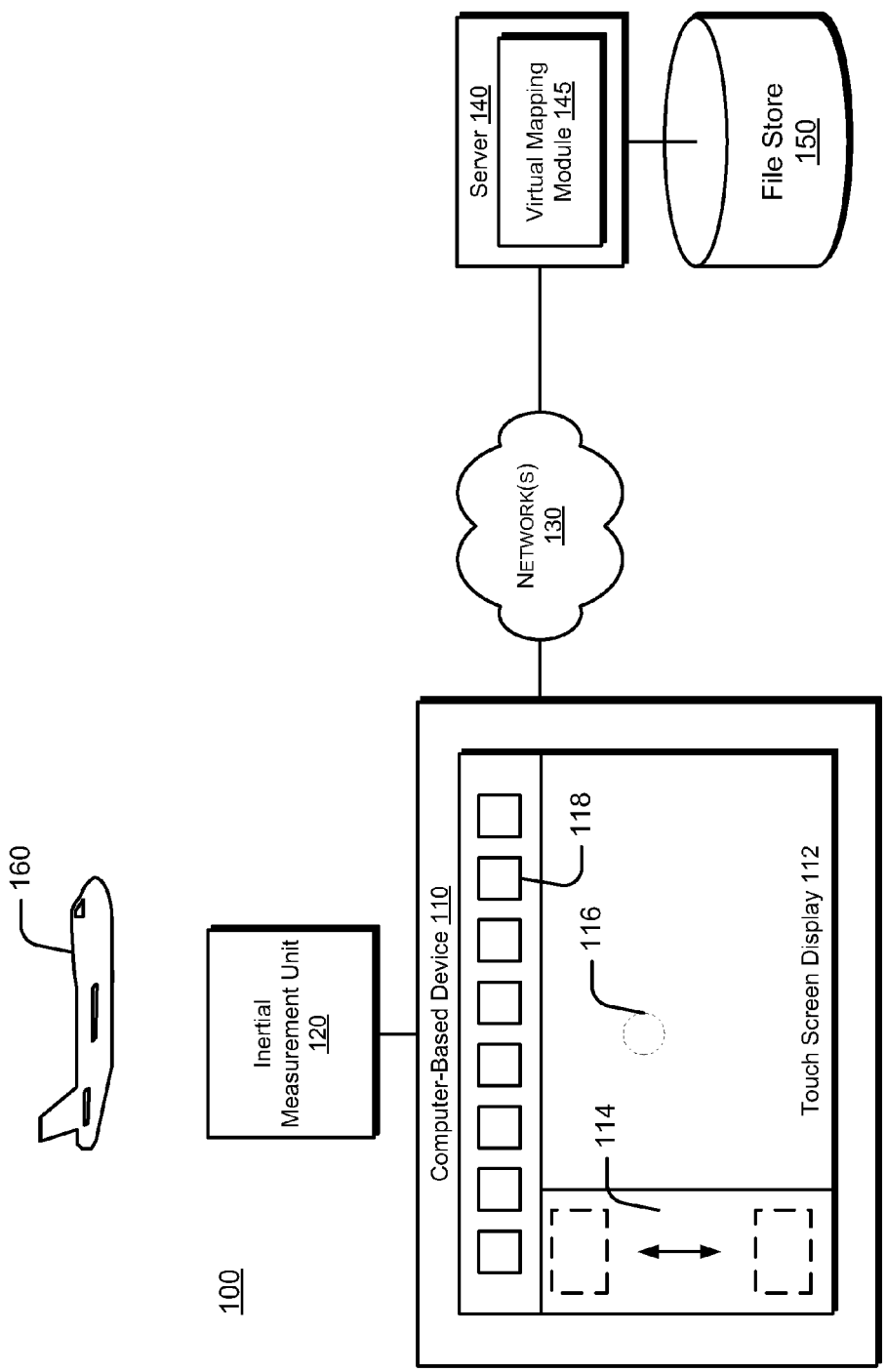
FIG. 1 is a schematic illustration of a computing environment in which IMU-based localization may be implemented, according to embodiments.

FIG. 1 is a schematic illustration of a computing environment in which IMU-based localization may be implemented, according to embodiments. Referring to FIG. 1, in brief overview in one embodiment environment 100 comprises a computer-based device 110, an inertial measurement unit 120, one or more communication networks 130, a server 140 and a file store 150. In some embodiments the environment 100 may comprise a vehicle such as an aircraft 160.

Figure 2:
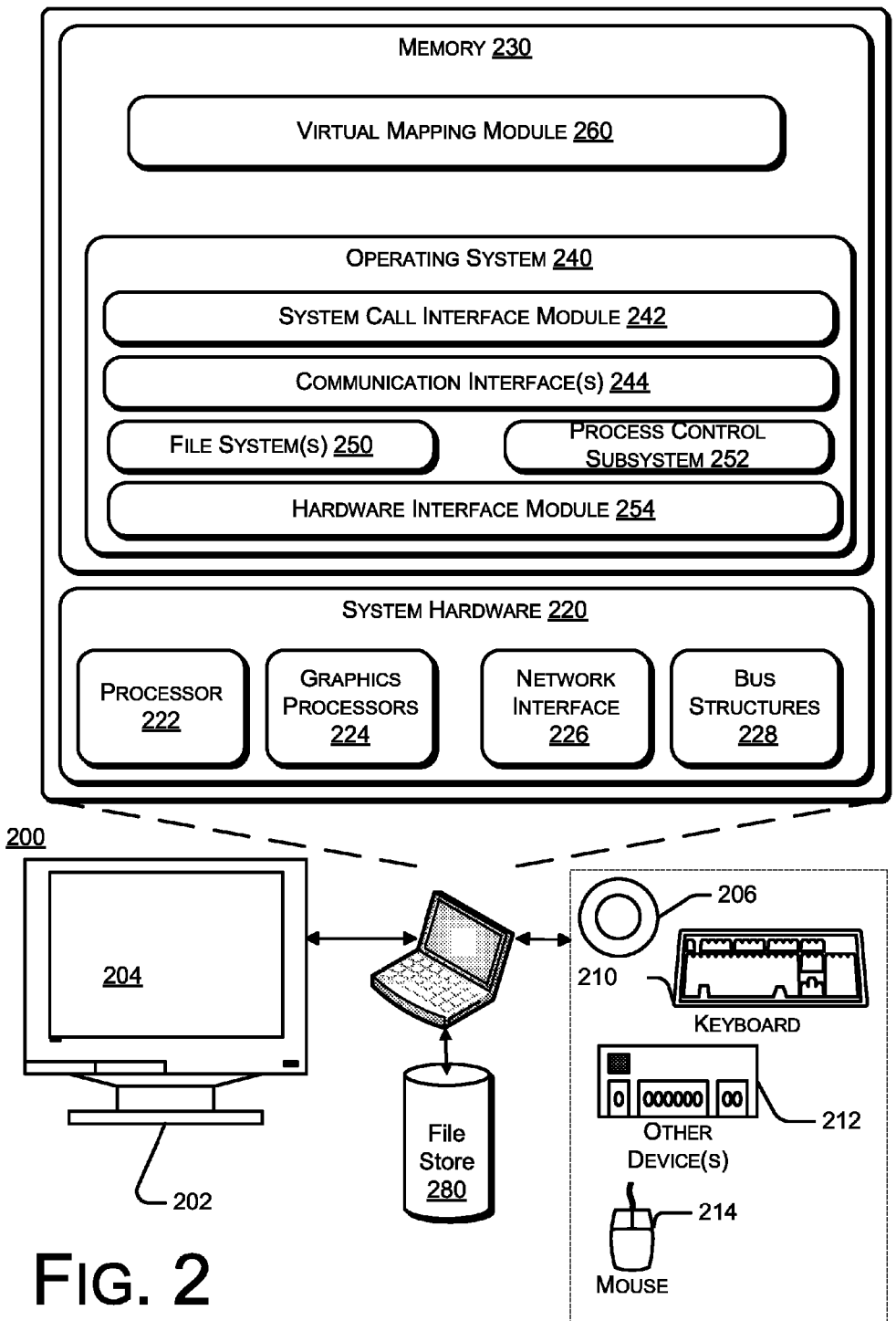
FIG. 2 is a schematic illustration of a computing device which may be adapted to implement IMU-based localization in accordance with some embodiments.

The computer-based device may be embodied as a portable computing device such as, e.g., a laptop computer, a tablet computer, a personal digital assistant, a smart phone, or the like. The server 140 may be embodied as a stationary computing device. FIG. 2 is a schematic illustration of a computing device 200 which may be adapted to either the computer-based device 110 or the server 140. In one embodiment, a computing device 200 includes one or more accompanying input/output devices including a display 202 having a screen 204, one or more speakers 206, a keyboard 210, one or more other I/O device(s) 212, and a mouse 214. The other I/O device(s) 212 may include a touch screen, a voice-activated input device, a track ball, and any other device that allows the system 200 to receive input from a user.

The computing device 200 includes system hardware 220 and memory 230, which may be implemented as random access memory and/or read-only memory. A file store 280 may be communicatively coupled to computing device 208. File store 280 may be internal to computing device 108 such as, e.g., one or more hard drives, CD-ROM drives, DVD-ROM drives, or other types of storage devices. File store 280 may also be external to computer 208 such as, e.g., one or more external hard drives, network attached storage, or a separate storage network.

System hardware 220 may include one or more processors 222, one or more graphics processors 224, network interfaces 226, and bus structures 228. As used herein, the term "processor" means any type of computational element, such as but not limited to, a microprocessor, a microcontroller, a complex instruction set computing (CISC) microprocessor, a reduced instruction set (RISC) microprocessor, a very long instruction word (VLIW) microprocessor, or any other type of processor or processing circuit.

Graphics processor(s) 224 may function as adjunct processor(s) that manages graphics and/or video operations. Graphics processor(s) 224 may be integrated onto the motherboard of computing system 200 or may be coupled via an expansion slot on the motherboard.

In one embodiment, network interface 226 could be a wired interface such as an Ethernet interface (see, e.g., Institute of Electrical and Electronics Engineers/IEEE 802.3-2002) or a wireless interface such as an IEEE 802.11a, b or g-compliant interface (see, e.g., IEEE Standard for IT-Telecommunications and information exchange between systems LAN/MAN—Part II: Wireless LAN Medium Access Control (MAC) and Physical Layer (PHY) specifications Amendment 4: Further Higher Data Rate Extension in the 2.4 GHz Band, 802.11G-2003). Another example of a wireless interface would be a general packet radio service (GPRS) interface (see, e.g., Guidelines on GPRS Handset Requirements, Global System for Mobile Communications/GSM Association, Ver. 3.0.1, December 2002).

Bus structures 228 connect various components of system hardware 228. In one embodiment, bus structures 228 may be one or more of several types of bus structure(s) including a memory bus, a peripheral bus or external bus, and/or a local bus using any variety of available bus architectures including, but not limited to, 11-bit bus, Industrial Standard Architecture (ISA), PCI, Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI), PCI Express (PCI-E) bus, Serial ATA (SATA) bus, or the like.

Memory 230 may include an operating system 240 for managing operations of computing device 208. In one embodiment, operating system 240 includes a hardware interface module 254 that provides an interface to system hardware 220. In addition, operating system 240 may include a file system 250 that manages files used in the operation of computing device 208 and a process control subsystem 252 that manages processes executing on computing device 208.

Operating system 240 may include (or manage) one or more communication interfaces that may operate in conjunction with system hardware 220 to transceive data packets and/or data streams from a remote source. Operating system 240 may further include a system call interface module 242 that provides an interface between the operating system 240 and one or more application modules resident in memory 130. Operating system 240 may be embodied as a Windows® brand operating system or as a UNIX operating system or any derivative thereof (e.g., Linux, Solaris, iOS, Android, etc.), or other operating systems.

In one embodiment, memory 230 includes a virtual mapping module 260, which may be embodied as logic instructions encoded in a tangible computer-readable medium. In the computer device 208 which embodies the server 140 depicted in FIG. 1 the virtual mapping module, labeled as 145 in FIG. 1, maintains a virtual embodiment of a three-dimensional environment and objects within the environment. By way of example, in some embodiments the virtual mapping module 145 on the server may maintain a three-dimensional environment of aircraft 160. The three-dimensional environment may include the various structures and components which comprise the aircraft 160. In the computing device 208 which embodies the computer-based device 110 depicted in FIG. 1 the virtual mapping module 260 may comprise logic instructions which, when executed by the processor(s) 222 cause the processor(s) 222 to implement IMU-based localization through the three-dimensional environment maintained by the virtual mapping module 145 in server 140.

Referring back to FIG. 1, in some embodiments the inertial measurement unit (IMU) 120 may be integrated into computer-based device 110. In alternate embodiments the IMU 120 may be a separate device which may be coupled to computer-based device 110 via a suitable interface, e.g., a universal serial bus (USB) port or the like. IMU 120 may comprise an internal microprocessor or may rely upon a processor in computer-based device 110 for processing tasks. In some embodiments IMU 120 may include one or more microelectromechanical systems (MEMS), such as motion sensor devices that measure relative acceleration (accelerometers) and rotational velocity (gyros). The outputs generated by the IMU 120 may be provided to the computer-based device 110. The movement detected by the movement sensors may be used to calculate a position and orientation of the IMU 120 while the IMU is in motion. The IMU 120 may also provide an estimate of translational and rotational displacement during motion.

The IMU 120 and the computer-based device 110 may be coupled to the server 140 via one or more communication networks 130. Communication network(s) 130, may be embodied as a as a Personal Area Network (PAN), Local Area Network (LAN), Metropolitan Area Network (MAN) or a Wide Area Network (WAN), a proprietary communication network, or the like. Furthermore, communication networks 130, 132, 134 may comprise one or more sub-networks. By way of example, and not by limitation, communication networks 130, 132, 134 may comprise one or more access points (APs) that establish access to a LAN or directly to a backbone network such as the Internet. Additionally, the communication networks 130, 132, 134 may include a variety of input/output transports such as, but not limited to; wired USB or serial links, Wireless 802.11x link, wireless USB, Blue-tooth, infra red links, cellular networks, or the like.

Having described structural components of a system to implement IMU-based localization, operations and interactions of the various components of the system will now be described. In some embodiments the computer-based device 110 and the IMU 120 cooperate to enable navigation through the virtual environment maintained by the server 140.

Figure 3:
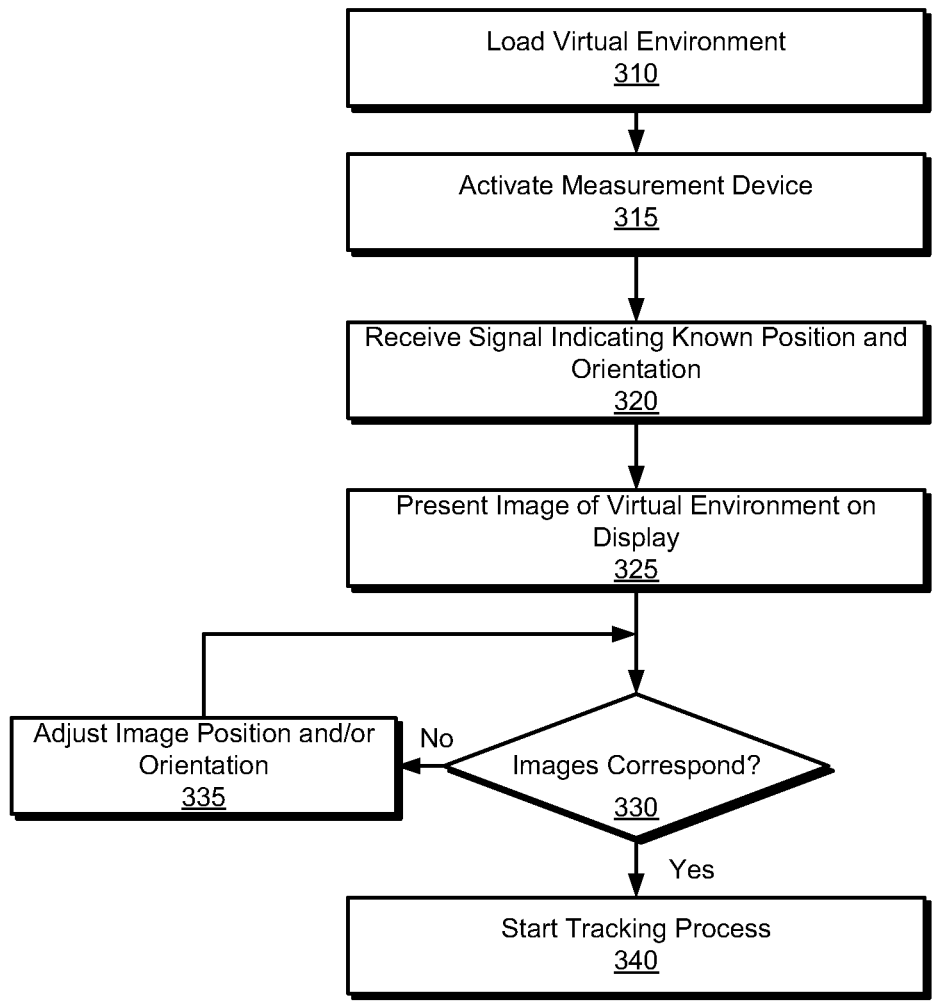
FIGS. 3-4 are flowcharts illustrating operations in a method for IMU-based localization according to embodiments.

FIG. 3 is a flowchart illustrating operations in a method for IMU-based localization according to embodiments. In particular, FIG. 3 depicts operations in a localization process by which an initial location in virtual space may be selected. In some embodiments the operations depicted in FIG. 3 may be implemented by the virtual mapping module 260 which executes on the computer-based device 110, alone or in cooperation with virtual mapping module 145 which executes in the server 140.

Referring to FIG. 3, at operation 310 a virtual environment is loaded into the memory of the computer-based device 110. In some embodiments the complete virtual environment may be loaded from the virtual mapping module 145 of the server 140 into the memory of the computer-based device 110 via the network(s) 130. However, in other embodiments only a portion of the virtual environment is loaded into the memory of the computer-based device 110. By way of example, a user of the computer based device 110 may request a specific region of the virtual environment, and only the requested region is loaded from the virtual mapping module 145 of the server 140 into the memory of the computer-based device 110.

At operation 315 the IMU 120 is activated such that the IMU 120 will generate signals indicative of motion experienced by the IMU. At operation 320 a signal is received which indicates a known physical location that is modeled in the virtual environment. By way of example, a user may select one of a plurality of predetermined locations proximate or in an aircraft 160 from a menu 118 on touch screen display 112 and may position the computer-based device 110 and the IMU 120 at the selected location. In response to the selection, the virtual mapping module 260 which executes on the computer-based device 110 renders, at operation 320 an image of the virtual environment from the selected location.

At operation 330 a determination is made as to whether the virtual image presented on the display corresponds to an image of the real environment from the same perspective. In some embodiments this determination may be performed manually. By way of example, a user of the computer-based device may view the virtual image presented on the display 112 of the device 110 and may make a subjective judgment regarding whether the images correspond. In other embodiments this determination may be made in an objective fashion by logic which executes on computer-based device 110 or on a computer coupled thereto. By way of example, in some embodiments computer-based device 110 may comprise an image-capture device, e.g., a camera, which may be used to capture an image of the real environment proximate the computer-based device. In such embodiments attributes of an image captured by the computer-based device may be compared to attributes from the virtual image presented on the display to determine whether the images correspond.

If, at operation 330, the virtual image does not correspond to the image of the real environment then control passes to operation 335 and the relative image position and orientation is adjusted by the user until the virtual and real environments are aligned. In yet another embodiment the virtual image on the display may be manipulated, e.g., by rotating, panning, and/or zooming the virtual viewpoint by using the touch screen (or other viewpoint controls) or physically moving the display device (and attached sensor), until the virtual image corresponds to the image of the real environment. By contrast, if at operation 330 the images correspond then the localization process may be considered a success and the location of the computer-based device 110 and IMU 120 in the real world is synchronized with the perspective of the virtual image presented on the display 112.

Accordingly, control passes to operation 340 and a tracking process is initiated on the computer-based device 110. In some embodiments the tracking process uses input from the IMU 120 alone or in combination with user inputs from one or more user interfaces on the display 112 to allow the user to navigate through a virtual environment presented on display 112 that corresponds to the real environment through which the IMU 120 and computer device 112 are moving.

Figure 4:
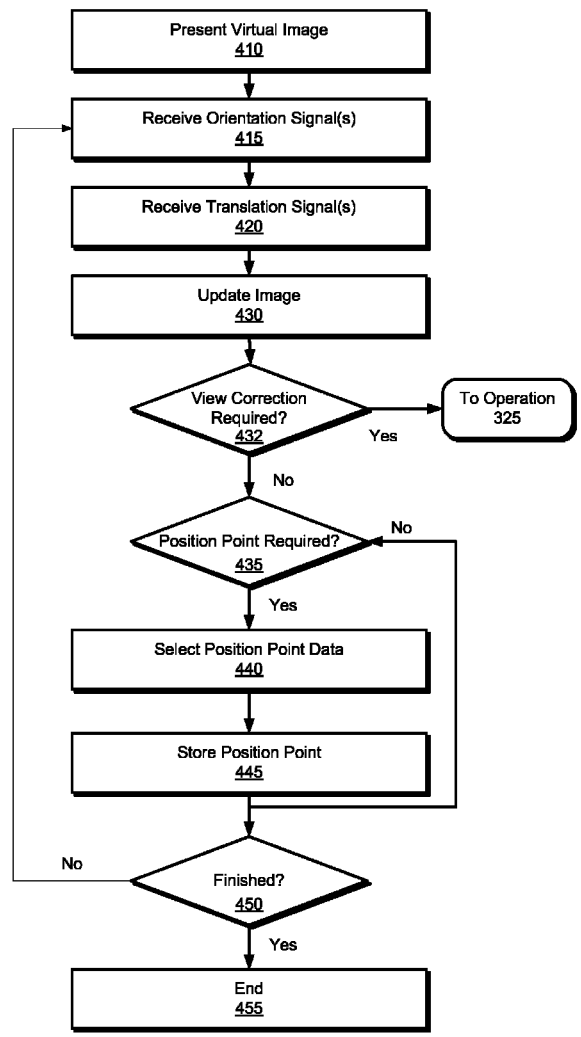

Another aspect of the tracking process will be described with reference to FIG. 4. Referring to FIG. 4, at operation 410 the perspective view of the virtual image is presented on the display 112. At operation 415 the virtual mapping module 260 which executes on the computer-based device 110 receives orientation signals which indicate that the IMU 120 is subject to rotational motion. In some embodiments the orientation signals are generated by the IMU 120 in response to the IMU 120 being rotated by a user holding the computer-based device 110. In other embodiments the rotation signals may be generated by a user input into a user interface on touch screen display 112.

Similarly, at operation 420 the virtual mapping module 260 receives translation signals. In some embodiments the translation signals which indicates that the IMU 120 is subject to translational motion. In some embodiments the translation signals are derived from data received from the IMU 120 in response to the IMU 120 being translated by a user holding the computer-based device 110. In other embodiments the translation signals may be generated by a user input into a user interface 114 on touch screen display 112.

At operation 430 the virtual image presented on the display 112 is updated in response to the rotation signals and the translation signals. In some embodiments the orientation data from the IMU 120 and may be represented in a 3×3 rotation matrix. Any additional screen-based translation is included in the resulting solution by post-multiplying the 3×3 rotation matrix by the 3×1 vector of x,y,z translations defined in screen coordinates, as shown in Equation (1):

$$\begin{bmatrix} Rot \\ (3\times3) \end{bmatrix} \begin{bmatrix} Xs \\ Ys \\ Zs \end{bmatrix} = \begin{bmatrix} Xa \\ Ya \\ Za \end{bmatrix} \quad \text{EQ (1)}$$

where [ROT] represents a 3×3 rotation matrix, the 3×1 vector $[Xs,Ys,Zs]^T$ is the screen translation, and $[Xa,Ya,Za]^T$ is the resulting translation in absolute coordinates. This data is then re-factored into a 4×4 homogeneous transformation matrix in the form:

$$\begin{bmatrix} & & & Xa \\ & Rot & & Ya \\ & (3\times3) & & Za \\ 0 & 0 & 0 & 1 \end{bmatrix} \quad \text{EQ (2)}$$

In one embodiment the display 112 receives the location data (position and orientation information) in the form of a 4×4 matrix shown in Equation (2), relative to the starting location, from the computational process that receives data from IMU 120. This matrix is then pre-multiplied by the matrix associated with the starting location, as indicated in Equation (3)

$$\begin{bmatrix} \text{Starting} \\ \text{Matrix} \\ (4\times4) \end{bmatrix} \begin{bmatrix} \text{Relative} \\ \text{Matrix} \\ (4\times4) \end{bmatrix} = \begin{bmatrix} \text{Resulting} \\ \text{Matrix} \\ (4\times4) \end{bmatrix} \quad \text{EQ (3)}$$

where all three matrices are 4×4 homogeneous transformation matrices. In some embodiments the resulting matrix may be used directly or converted into other format (depending on the graphics application) to set the viewpoint in the virtual environment, and the graphics display is updated to present the new viewpoint (operation 430).

At operation 432 it is determined whether the virtual image aligns with the image of the real object. If, at operation 432, view correction is needed then control passes back to operation 325. By contrast, if view correction is not needed then control passes to operation 435.

If, at operation 435, a selection of an object or of an (x, y, z) position point is required then the user changes orientation by moving the computer-based device 110 and IMU 120 and/or using on-screen translation to position an object or area of interest on the display 112. The object or area of interest may be selected (operation 440) using a suitable user interface such as, e.g., a crosshair reticle 116 or other targeting element. The position point may be stored (operation 445) in a suitable memory location, or data from the selected object may be presented to the user. Other position-based selection actions may also be enabled with this process, such as using the selection event to select an object to receive additional data about the object, change its color, disable it, or similar actions.

If, at operation 450, the user is finished navigating through the environment then control passes to operation 455 and the process ends. By contrast, if the user wishes to continue navigation then control passes back to operation 415.

Thus, the operations depicted in FIG. 3 enable a user to align a virtual environment with a real environment in operations 310 through 340, and operations 415 through 450 define a loop by which a user of computing device 110 and IMU 120 can move the computing device 110 and IMU 120 through a path in three dimensional space inside or proximate the vehicle 160 and a corresponding view of the virtual environment the will be presented on the display 112 of computer-based device 110. Alternatively, a user can maneuver through the virtual environment using inputs on display device 112. This process describes human-based navigation that is enabled by continuous alignment of the real and virtual environments using data supplied by the IMU-based localization process.

At any point in time, a user may select on the screen of the display device one or more items of interest, and in response the display device may display information about the object at the selection point, and/or store coordinates of the selection point.

In an alternate embodiment, navigation instructions used to guide the user to specific locations may be presented on the display device. This may include 3D direction indicators (arrows, etc.) or text or audio feedback elements. For example, a user may desire to go to a specific location on an airplane by entering or selecting one or more sets of goal coordinates, and then request an automated navigation application to produce instructions to guide the user from the current location to the goal location(s). As the user is moving through the real environment, the virtual environment is updated to show the corresponding view of the virtual environment, along with updates to the navigation indicator elements. This automated navigation assistance application requires access to the current position and orientation of the user, who is carrying an IMU-equipped display device that implements the localization process described above.

In the foregoing discussion, specific implementations of exemplary processes have been described, however, it should be understood that in alternate implementations, certain acts need not be performed in the order described above. In alternate embodiments, some acts may be modified, performed in a different order, or may be omitted entirely, depending on the circumstances. Moreover, in various alternate implementations, the acts described may be implemented by a computer, controller, processor, programmable device, firmware, or any other suitable device, and may be based on instructions stored on one or more computer-readable media or otherwise stored or programmed into such devices (e.g. including transmitting computer-readable instructions in real time to such devices). In the context of software, the acts described above may represent computer instructions that, when executed by one or more processors, perform the recited operations. In the event that computer-readable media are used, the computer-readable media can be any available media that can be accessed by a device to implement the instructions stored thereon.

In various embodiments, one or more of the operations discussed herein, e.g., with reference to FIGS. 3-4, may be implemented as hardware (e.g., logic circuitry), software, firmware, or combinations thereof, which may be provided as a computer program product, e.g., including a machine-readable or computer-readable medium having stored thereon instructions used to program a computer to perform a process discussed herein. The machine-readable medium may include any suitable storage device such as those discussed with reference to FIGS. 3 and 4.

Additionally, such computer-readable media may be downloaded as a computer program product, wherein the program may be transferred from a remote computer (e.g., a server) to a requesting computer (e.g., a client) by way of data signals embodied in a carrier wave or other propagation medium via a communication link (e.g., a modem or network connection). Accordingly, herein, a carrier wave shall be regarded as comprising a machine-readable medium.

Reference in the specification to "one embodiment" or "an embodiment" means that a particular feature, structure, or characteristic described in connection with that embodiment may be included in at least one implementation. The appearances of the phrase "in one embodiment" in various places in the specification may or may not be all referring to the same embodiment.

Also, in the description and claims, the terms "coupled" and "connected," along with their derivatives, may be used. In some embodiments, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. A method performed by a computer system, the method comprising:
   determining a position and orientation in a real three-dimensional space of a measurement device relative to a real object in the three-dimensional space;
   rendering, on a display device coupled to the measurement device, a virtual perspective view of a virtual image of a virtual object corresponding to the real object in a virtual three-dimensional space, wherein the virtual perspective view corresponds to a real perspective view of the real object from the position of the measurement device;
   receiving an image from a camera coupled to the measurement device, wherein the image corresponds to the real perspective view; and
   determining whether the virtual object in the virtual perspective view and the real object in the image match, wherein the virtual perspective view is adjusted in response to determining that the virtual object and the real object do not match.

2. The method of claim 1, wherein determining the position and the orientation comprises:
   receiving a signal indicating that the measurement device is positioned in a known physical location in the real three-dimensional space; and
   confirming a correspondence between the real perspective view and the virtual perspective view and synchronizing the location of the measurement device with the perspective of the virtual image rendered on the display device.

3. The method of claim 1, wherein the measurement device comprises an inertial measurement unit (IMU) and further comprising:
   receiving a rotation input indicating a first change in the orientation of the IMU relative to the real object; and
   rotating, on the display device, the virtual perspective view such that the virtual perspective view aligns with the real perspective view based on the position and the orientation derived from the rotation input.

4. The method of claim 3, wherein the rotation input comprises a first input from the IMU, a second input from an input device coupled to the IMU, a third input device coupled to an IMU data processing application, or a combination thereof.

5. The method of claim 3, wherein confirming a correspondence between the real perspective view and the virtual perspective view comprises receiving a translation input indicating a second change in the position of the IMU relative to the real object, or updating, on the display device, the virtual perspective view such that the virtual perspective view aligns with the real perspective view based on the position and the orientation of the measurement device.

6. The method of claim 5, wherein the translation input comprises a first input from the measurement device, a second input from an input device coupled to the measurement device and the display device, or both.

7. The method of claim 1, further comprising:
   receiving an input from the display device to select one or more items of interest; and
   in response to the input, displaying information about the one or more items of interest.

8. A computer-based system, comprising:
   a measurement device;
   a display coupled to the measurement device;
   a processor; and
   a tangible computer-readable medium coupled to the processor and storing instructions which, when executed by the processor, cause the processor to:
      determine a position and orientation in a real three-dimensional space of the measurement device relative to a real object in the three-dimensional space;
      render on the display, a virtual perspective view of a virtual image of a virtual object corresponding to the real object in a virtual three-dimensional space, wherein the virtual perspective view corresponds to a real perspective view of the real object from the position of the measurement device;
      receive an image from a camera coupled to the measurement device, wherein the image corresponds to the real perspective view; and
      determine whether the virtual object in the virtual perspective view and the real object in the image match, wherein the virtual perspective view is adjusted in response to determining that the virtual object and the real object do not match.

9. The computer-based system of claim 8, wherein the instructions further cause the processor to:
receive a signal indicating that the measurement device is positioned in a known physical location in the three-dimensional space; and
confirm a correspondence between the real perspective view and the virtual perspective view and synchronizing the location of the measurement device with the perspective of the virtual image rendered on the display device.

10. The computer-based system of claim 9, wherein the instructions further cause the processor to:
receive a rotation input indicating a change in the orientation of the measurement device relative to the real object; and
rotate, on the display, the virtual perspective view such that the virtual perspective view aligns with the real perspective view based on the position and the orientation of the measurement device.

11. The computer-based system of claim 10, wherein the rotation input comprises at least one of a first input from an inertial measurement unit, a second input from an input device coupled to the measurement device and the display, or both.

12. The computer-based system of claim 9, wherein the instructions further cause the processor to:
receive an input from the display to select one or more items of interest; and
in response to the input, display information about the one or more items of interest.

13. The computer-based system of claim 12, wherein the input comprises at least one of a first input from the measurement device, a second input from an input device coupled to the measurement device and the display, or both.

14. The computer-based system of claim 9, wherein the real object includes a plurality of internal components of an airplane.

15. A computer program product comprising instructions stored in a tangible computer-readable medium which, when executed by a processor, cause the processor to:
determine a position and orientation in a real three-dimensional space of a measurement device relative to a real object in the three-dimensional space;
render, on a display device coupled to the measurement device, a virtual perspective view of a virtual image of a virtual object corresponding to the real object in a virtual three-dimensional space, wherein the virtual perspective view corresponds to a real perspective view of the real object from the position of the measurement device;
receive an image from a camera coupled to the measurement device, wherein the image corresponds to the real perspective view; and
determine whether the virtual object in the virtual perspective view and the real object in the image match, wherein the virtual perspective view is adjusted in response to determining that the virtual object and the real object do not match.

16. The computer program product of claim 15, wherein the instructions further cause the processor to:
receive a signal indicating that the measurement device is positioned in a known physical location in the real three-dimensional space; and
confirm a correspondence between the real perspective view of the real object and the virtual perspective view of the virtual object and synchronizing the location of the measurement device with the perspective of the virtual image rendered on the display device.

17. The computer program product of claim 16, wherein the measurement device comprises an inertial measurement unit and wherein the instructions further cause the processor to:
receive a rotation input indicating a first change in the orientation of the inertial measurement unit relative to the real object; and
rotate, on the display device, the virtual perspective view such that the virtual perspective view aligns with the real perspective view based on the position and the orientation of the measurement device.

18. The computer program product of claim 17, wherein the rotation input comprises a first input from the inertial measurement unit, a second input from an input device coupled to the measurement device and the display device, or both.

19. The computer program product of claim 18, wherein the instructions further cause the processor to:
receive a translation input indicating a second change in the position of the inertial measurement unit relative to the real object; and
update, on the display device, the virtual perspective view such that the virtual perspective view aligns with the real perspective view of the real three-dimensional space from the position and the orientation of the measurement device.

20. The computer program product of claim 19, wherein the translation input comprises at least one of a third input from the inertial measurement unit, a fourth input from the input device, or both.

21. The computer program product of claim 15, wherein the instructions further cause the processor to:
receive an input from the display device to select one or more items of interest; and
in response to the input, display information about the one or more items of interest.

* * * * *